US012627197B2

(12) United States Patent
Miyaji et al.

(10) Patent No.: US 12,627,197 B2
(45) Date of Patent: May 12, 2026

(54) STATOR AND ROTATING ELECTRIC MACHINE

(71) Applicant: DENSO CORPORATION, Kariya-city (JP)

(72) Inventors: Katsuyoshi Miyaji, Kariya-city (JP); Seiichi Murakami, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 214 days.

(21) Appl. No.: 18/221,670

(22) Filed: Jul. 13, 2023

(65) Prior Publication Data

US 2023/0361642 A1 Nov. 9, 2023

Related U.S. Application Data

(63) Continuation of application No. PCT/JP2022/000557, filed on Jan. 11, 2022.

(30) Foreign Application Priority Data

Jan. 13, 2021 (JP) ................................. 2021-003674

(51) Int. Cl.
*H02K 3/50* (2006.01)
*H02K 3/52* (2006.01)
*H02K 5/22* (2006.01)

(52) U.S. Cl.
CPC .............. *H02K 5/225* (2013.01); *H02K 3/50* (2013.01); *H02K 3/52* (2013.01); *H02K 3/522* (2013.01); *H02K 2203/12* (2013.01)

(58) Field of Classification Search
CPC .......... H02K 5/225; H02K 3/34; H02K 3/345; H02K 3/522; H02K 3/52; H02K 3/50; (Continued)

(56) References Cited

U.S. PATENT DOCUMENTS

2008/0157610 A1 7/2008 Watanabe et al.
2018/0083516 A1* 3/2018 Endo ...................... H02K 5/128
(Continued)

FOREIGN PATENT DOCUMENTS

JP 2010-183660 A 8/2010
JP 2018-207615 A 12/2018

*Primary Examiner* — Alexander A Singh
(74) *Attorney, Agent, or Firm* — Oliff PLC

(57) ABSTRACT

A stator includes: an annular stator core having tooth portions; an insulator made of an electrically-insulative resin material and covering predetermined parts of the stator core; windings wound on the tooth portions with the insulator interposed therebetween; and terminals made of an electrically-conductive metal plate and connected with end portions of the corresponding windings. The stator is connected to an electrical connection target via the terminals. Each of the terminals has a connection terminal portion axially extending so as to be connected to the connection target, a winding connection portion connected with the end portions of the corresponding windings, and an extension portion extending between the connection terminal portion and the winding connection portion in a circumferential direction. Each of the terminals is supported, with part of the extension portion thereof abutting against a supporting portion of the insulator at a plurality of positions, so as to maintain its posture.

8 Claims, 11 Drawing Sheets

(58) Field of Classification Search
     CPC ........... H02K 2203/09; H02K 2203/12; H02K
                   11/30; H02K 11/33; H02K 3/28; H02K
                                                    3/38
     USPC ........................................... 310/71, 214, 215
     See application file for complete search history.

(56)                      References Cited

U.S. PATENT DOCUMENTS

| 2018/0262075 | A1 | 9/2018 | Csoti et al. | |
| 2019/0140496 | A1 | 5/2019 | Hong | |
| 2021/0408861 | A1 | 12/2021 | Kim | |
| 2022/0209608 | A1* | 6/2022 | Yamamoto | H02K 11/33 |

* cited by examiner

STATOR AND ROTATING ELECTRIC MACHINE

CROSS-REFERENCE TO RELATED APPLICATIONS

The present application is a continuation application of International Application No. PCT/JP2022/000557 filed on Jan. 11, 2022, which is based on and claims priority from Japanese Patent Application No. 2021-003674 filed on Jan. 13, 2021. The entire contents of these applications are incorporated by reference into the present application.

BACKGROUND

1 Technical Field

The present disclosure relates to stators and rotating electric machines.

2 Description of Related Art

There are known stators of rotating electric machines which employ terminals made of an electrically-conductive metal plate to connect end portions of windings to an electrical component such as a circuit board. The terminals are mounted to and thus supported by an insulator that is made of an electrically-insulative resin material and mounted to a stator core.

SUMMARY

According to a first aspect of the present disclosure, there is provided a stator which includes: an annular stator core that has a plurality of tooth portions extending radially inward and arranged in a circumferential direction; an insulator made of an electrically-insulative resin material and covering predetermined parts of the stator core; windings wound on the tooth portions of the stator core with the insulator interposed therebetween; and terminals made of an electrically-conductive metal plate and connected with end portions of corresponding ones of the windings. The stator is configured to be connectable to an electrical connection target via the terminals. Each of the terminals has a connection terminal portion extending in an axial direction so as to be connected to the connection target, a winding connection portion connected with the end portions of the corresponding windings, and an extension portion formed between the connection terminal portion and the winding connection portion and extending in the circumferential direction. Each of the terminals is supported, with part of the extension portion thereof abutting against a supporting portion of the insulator at a plurality of positions, so as to be capable of maintaining its posture.

According to a second aspect of the present disclosure, there is provided a rotating electric machine which includes a stator and a rotor. The stator includes: an annular stator core that has a plurality of tooth portions extending radially inward and arranged in a circumferential direction; an insulator made of an electrically-insulative resin material and covering predetermined parts of the stator core; windings wound on the tooth portions of the stator core with the insulator interposed therebetween; and terminals made of an electrically-conductive metal plate and connected with end portions of corresponding ones of the windings. The stator is configured to be connectable to an electrical connection target via the terminals. The rotor is configured to be driven, under a rotating magnetic field generated by the stator, to rotate. Each of the terminals has a connection terminal portion extending in an axial direction so as to be connected to the connection target, a winding connection portion connected with the end portions of the corresponding windings, and an extension portion formed between the connection terminal portion and the winding connection portion and extending in the circumferential direction. Each of the terminals is supported, with part of the extension portion thereof abutting against a supporting portion of the insulator at a plurality of positions, so as to be capable of maintaining its posture.

DESCRIPTION OF EMBODIMENTS

In the above-described stators known in the art (see, for example, Japanese Patent Application Publication No. JP 2010-183660 A), when connection terminal portions, which are formed in parts of the terminals, are connected to an electrical component such as a circuit board, external forces act on the connection terminal portions. At that time, it is preferable for the stator to have a structure that prevents the terminals from tilting and changing their postures. Moreover, the terminals have, in addition to the connection terminal portions, winding connection portions for connection with the end portions of the windings.

The inventors of the present application have investigated how to optimize the shapes of the entire terminals including the connection terminal portions and the winding connection portions and how to provide a support structure capable of stably supporting the terminals.

The present disclosure has been accomplished based on the results of the investigation by the inventors of the present application.

In the above-described stator and rotating electric machine according to the present disclosure, each of the terminals of the stator has the connection terminal portion extending in the axial direction so as to be connected to the connection target, the winding connection portion connected with the end portions of the corresponding windings, and the extension portion extending between the connection terminal portion and the winding connection portion in the circumferential direction. Each of the terminals is supported with part of the extension portion thereof abutting, at a plurality of positions, against a supporting portion of the insulator mounted to the stator core. That is, the posture of each of the terminals is maintained by a stable support structure. Consequently, each of the terminals is prevented from tilting even if the connection terminal portion thereof is subjected to an external force during the manufacturing process of the rotating electric machine, such as when the connection terminal portion is connected to the connection target. As a result, the manufacture of the rotating electric machine can be carried out smoothly.

Figure 1:
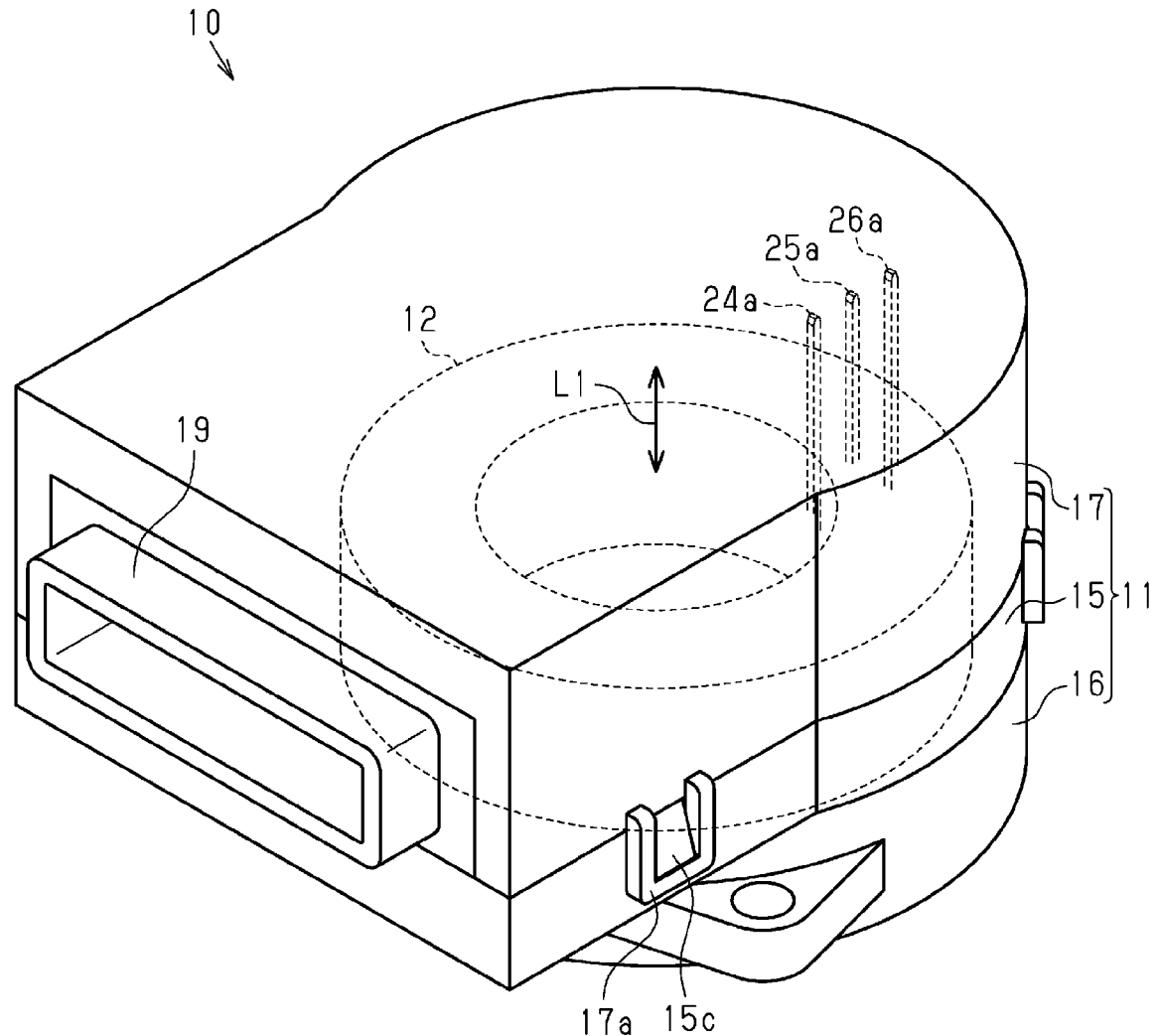
FIG. 1 is a perspective view showing a rotating electric machine according to an embodiment.
Figure 2:
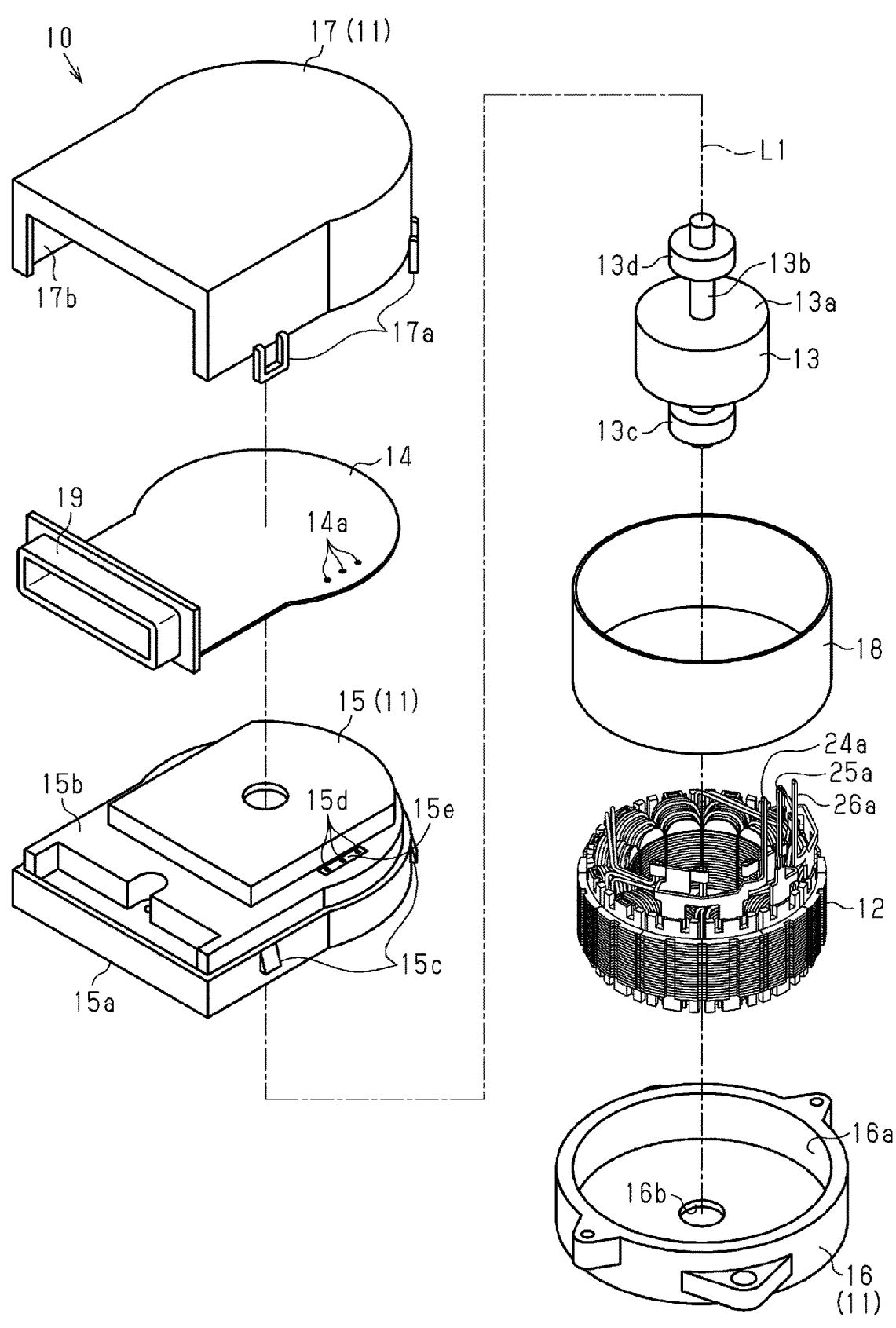
FIG. 2 is an exploded perspective view showing the rotating electric machine according to the embodiment.

Hereinafter, an embodiment of the stator and the rotating electric machine will be described. As shown in FIGS. 1 and 2, a rotating electric machine 10 includes a case 11, a stator 12, a rotor 13 and a circuit board 14. The case 11 includes a substantially flat base member 15, a first case member 16 mounted to a first surface 15a of the base member 15, and a second case member 17 mounted to a second surface 15b of the base member 15 which is on the opposite side to the first surface 15a. The first case member 16 is fixed to the base member 15 by, for example, mounting screws (not shown). The second case member 17 is removably mounted to the base member 15 by, for example, a so-called snap-fit structure in which: engagement pieces 17a are formed on the second case member 17; engagement protrusions 15c are formed on the base member 15; and the engagement pieces 17a engage respectively with the engagement protrusions 15.

The first case member 16 has an accommodation recess 16a for accommodating the stator 12 and the like; the accommodation recess 16a has a circular cross section. The stator 12 is accommodated in the accommodation recess 16a via a cylindrical spacer 18, thereby being immovably held.

The stator 12 has an annular shape. The stator 12 generates a rotating magnetic field upon energization thereof. The rotor 13 is rotatably accommodated in an inner space of the stator 12, so that the rotating magnetic field generated by the stator 12 can be applied to the rotor 13. In addition, the detailed configuration of the stator 12 will be described later.

The rotor 13 includes a main rotor body 13a, which includes a rotor core and permanent magnets, and a rotating shaft 13b fixed to a central part of the main rotor body 13a. The main rotor body 13a radially faces the stator 12. The rotating shaft 13b is rotatably supported by the first case member 16 and the base member 15 via bearings 13c and 13d. An end portion of the rotating shaft 13b is exposed to the outside of the case 11 through a shaft insertion hole 16b formed in a central part of the first case member 16, so as to be connected to a driven device (not shown). Upon generation of the rotating magnetic field by the stator 12, the rotor 13 including the rotating shaft 13b rotates to drive the driven device.

The circuit board 14 is arranged at a position facing the second surface 15b of the base member 15. Moreover, the circuit board 14 is arranged along the substantially flat base member 15 as well as along a direction perpendicular to an axis L1 of the rotating shaft 13b. The circuit board 14 is fixed to the base member 15 by, for example, mounting screws (not shown). By being arranged at a position facing the second surface 15b of the base member 15, the circuit board 14 is located on the opposite side of the base member 15 to the stator 12 and the rotor 13 both of which are located to face the first surface 15a of the base member 15. The circuit board 14 is electrically connected with connection terminal portions 24a, 25a and 26a of the stator 12, which will be described later, by fitting them into terminal connection holes 14a of the circuit board 14 and soldering them to the circuit board 14. The connection terminal portions 24a, 25a and 26a of the stator 12 extend along the axis L1 and protrude from terminal insertion holes 15d to the circuit board 14 side. The terminal insertion holes 15d are formed in an elastic insulating member 15e that is mounted to the base member 15.

On the circuit board 14, there are mounted various electronic components (not shown), which form a control circuit, and a connector 19. The circuit board 14 generates, with electric power supplied from an external power supply via the connector 19, three-phase exciting current to be supplied the stator 12. The control circuit formed in the circuit board 14 controls rotation of the rotor 13 through supply of the exciting current to the stator 12. The circuit board 14 is accommodated in an accommodation recess 17b of the second case member 17, with part of the connector 19 exposed from the second case member 17.

Figure 3:
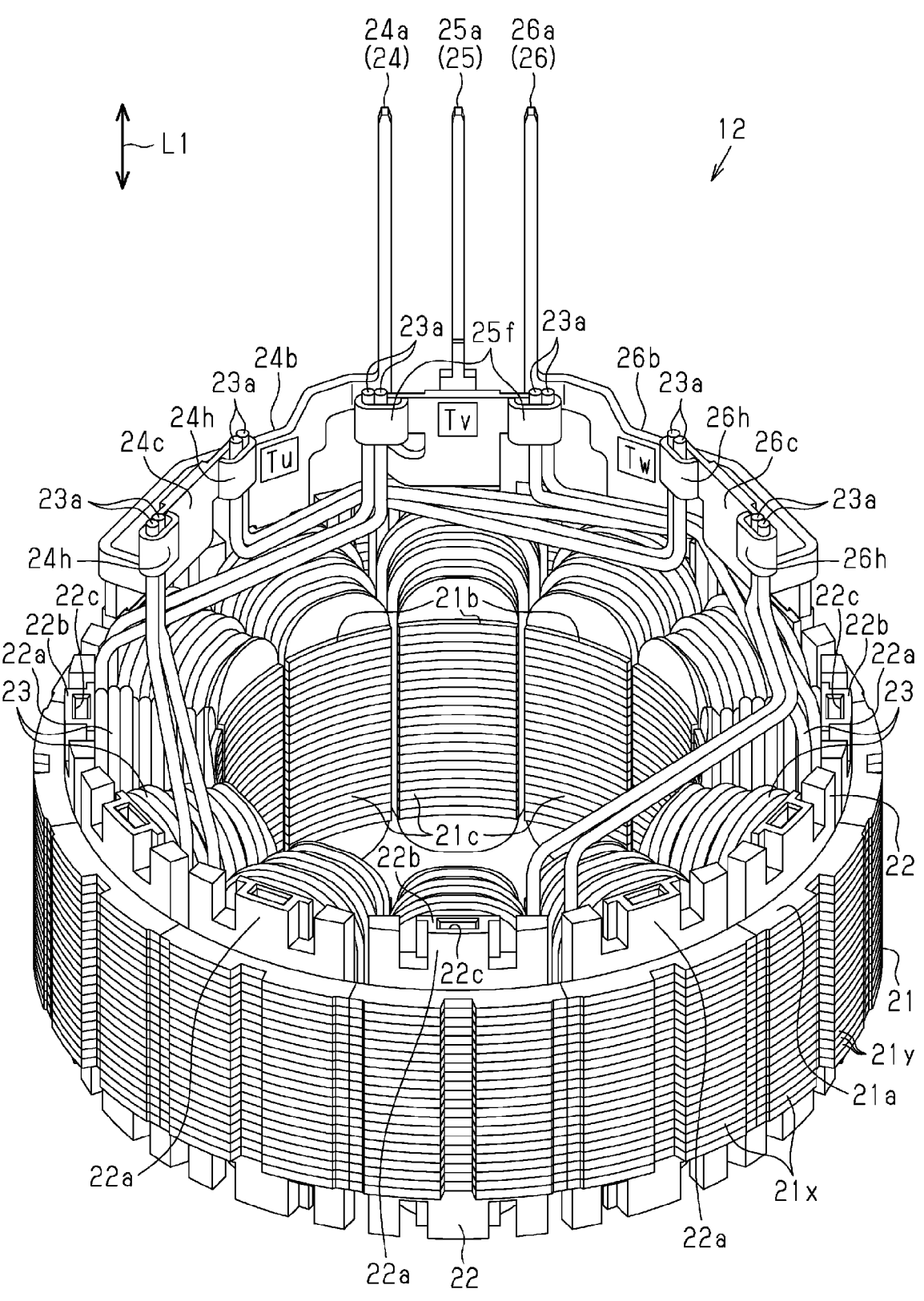
FIG. 3 is a perspective view showing a stator according to the embodiment.
Figure 4:
FIG. 4 is another perspective view showing the stator according to the embodiment.
Figure 5:
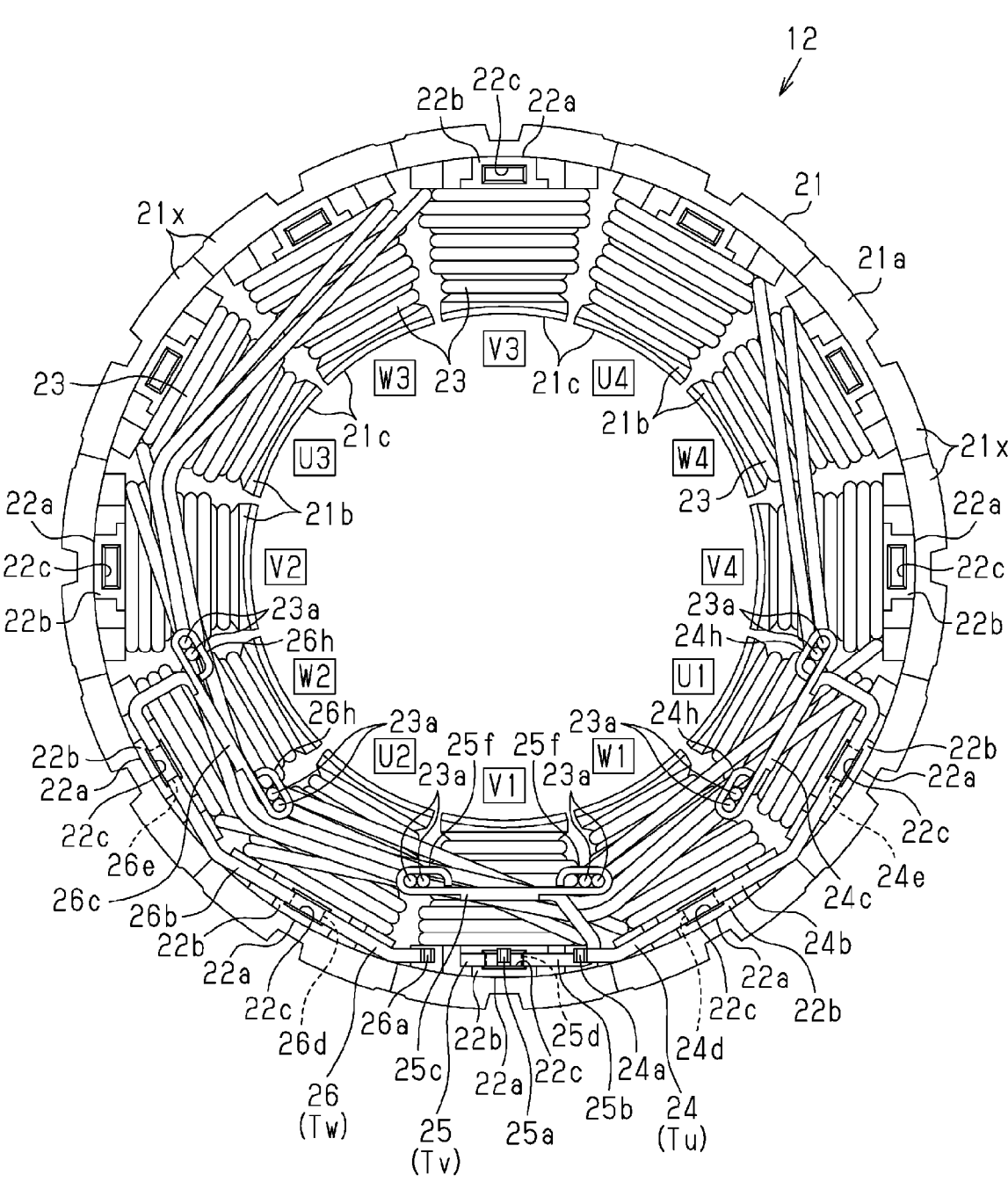
FIG. 5 is a plan view showing the stator according to the embodiment.

Next, the detailed configuration of the stator 12 will be described. As shown in FIGS. 3, 4 and 5, the stator 12 includes a stator core 21, and insulator 22, windings 23, and terminals 24, 25 and 26.

The stator core 21 is made of a magnetic metal material, and has an annular portion 21a and tooth portions 21b extending radially inward from an inner peripheral edge of the annular portion 21a. In the present embodiment, twelve tooth portions 21b are formed at equal intervals in the circumferential direction. The stator core 21 is constituted of twelve core segments 21x that are obtained by equally dividing the annular portion 21a for each individual tooth portion 21b and identical in shape to each other. All the core segments 21x are connected with each other in the circumferential direction, so as to together constitute the annular stator core 21. The stator core 21, i.e., each core segment 21x is formed by laminating a plurality of planar core sheets 21y in the direction of the axis L1.

To each of the core segments 21x constituting the stator core 21, there is mounted the insulator 22 that is made of an electrically-insulative resin material. In other words, the insulator 22 is provided for each of the core segments 21x. The insulator 22 covers outer peripheral surfaces of the tooth portions 21b except for exposing distal end surfaces 21c of the tooth portions 21b, i.e., those surfaces of the tooth portions 21b which face the main rotor body 13a of the rotor 13 (see FIG. 2), and exposing the annular portion 21a of the stator core 21. That is, the insulator 22 is interposed between the tooth portions 21b and the windings 23 wound on the tooth portions 21b, thereby securing electrical insulation of the windings 23.

Parts of the insulator 22, which are located near the annular portion 21a of the stator core 21 and at proximal end portions of the tooth portions 21b, have no windings 23 wound thereon; in these parts of the insulator 22, there are formed protruding portions 22a. Each of the protruding portions 22a extends in the direction of the axis L1 and has a distal end surface 22b formed as a flat surface along a direction perpendicular to the axis L1. In each of the protruding portions 22a, there is formed a mounting hole 22c that opens on the distal end surface 22b of the protruding portion 22a. The mounting hole 22c extends inside the protruding portion 22a in the direction of the axis L1. Moreover, the mounting hole 22c has a rectangular cross section; and an opening portion of the mounting hole 22c has an expanding taper shape. For each of the tooth portions 21b of the stator core 21, there are provided one protruding portion 22a and thus one mounting hole 22c of the insulator 22. Therefore, in the present embodiment, both the number of the protruding portions 22a and the number of the mounting holes 22c are equal to 12. The twelve protruding portions 22a and thus the twelve mounting holes 22c are located at equal intervals in the circumferential direction of the stator core 21. In the present embodiment, of the twelve mounting holes 22c, only five mounting holes 22c are used for mounting the terminals 24 to 26 to the insulator 22.

Figure 6:
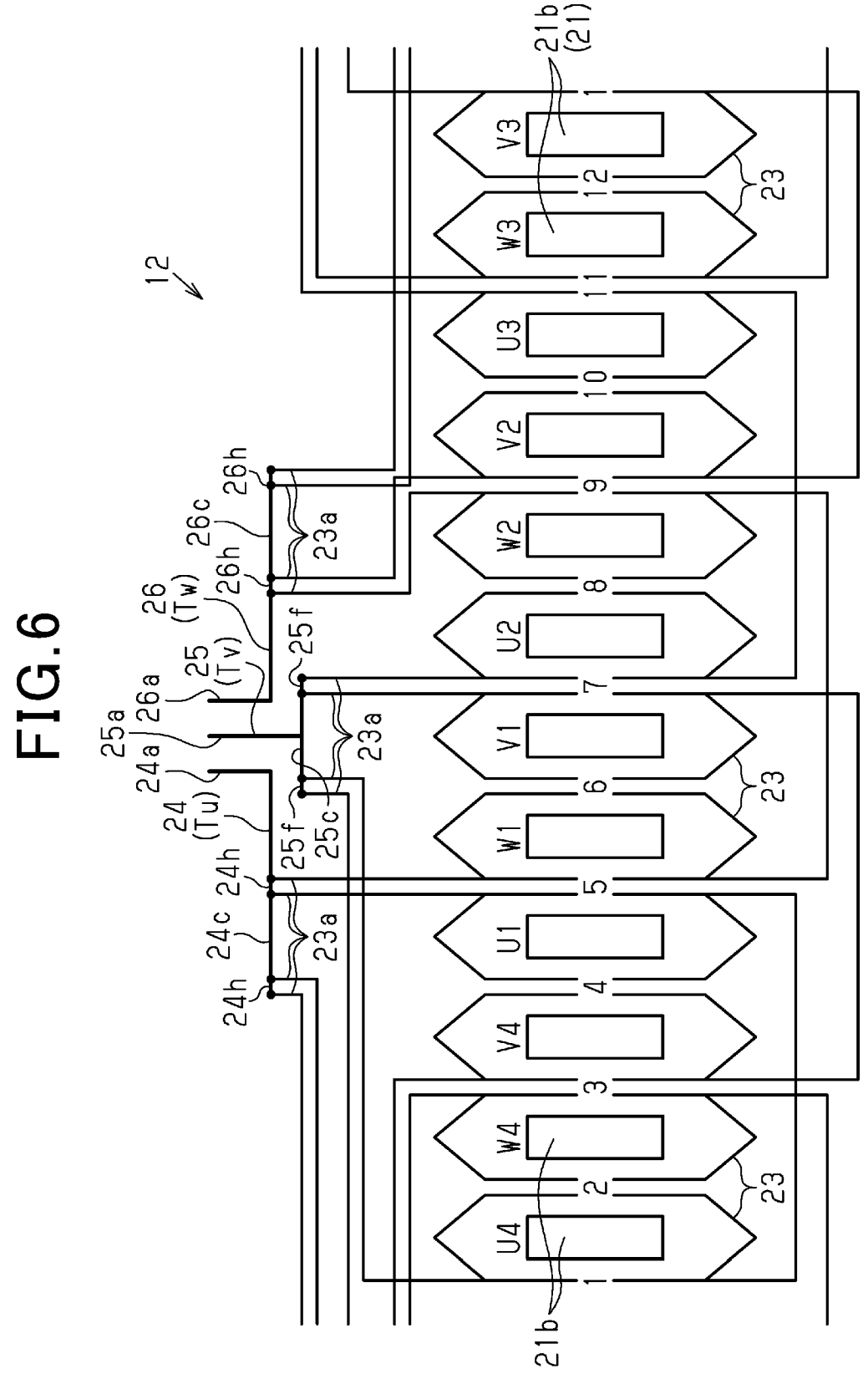
FIG. 6 is a connection diagram of windings according to the embodiment.

As shown in FIGS. 5 and 6, the windings 23 are wound in a concentrated winding manner respectively on the tooth portions 21b of the stator core 21. That is, on each of the tooth portions 21b, there is wound one winding 23. Therefore, in the present embodiment, the number of the windings 23 provided in the stator 12 is equal to 12. Specifically, the twelve windings 23 include four U-phase windings U1 to U4, four V-phase windings V1 to V4, and four W-phase windings W1 to W4. Moreover, in the plan view of FIG. 6, the twelve windings 23 are arranged in the clockwise direction in the order of the U-phase winding U1, the W-phase winding W1, the V-phase winding V1, the U-phase winding U2, the W-phase winding W2, the V-phase winding V2, the U-phase winding U3, the W-phase winding W3, the V-phase winding V3, the U-phase winding U4, the W-phase winding W4 and the V-phase winding V4.

Figures 7, 8:
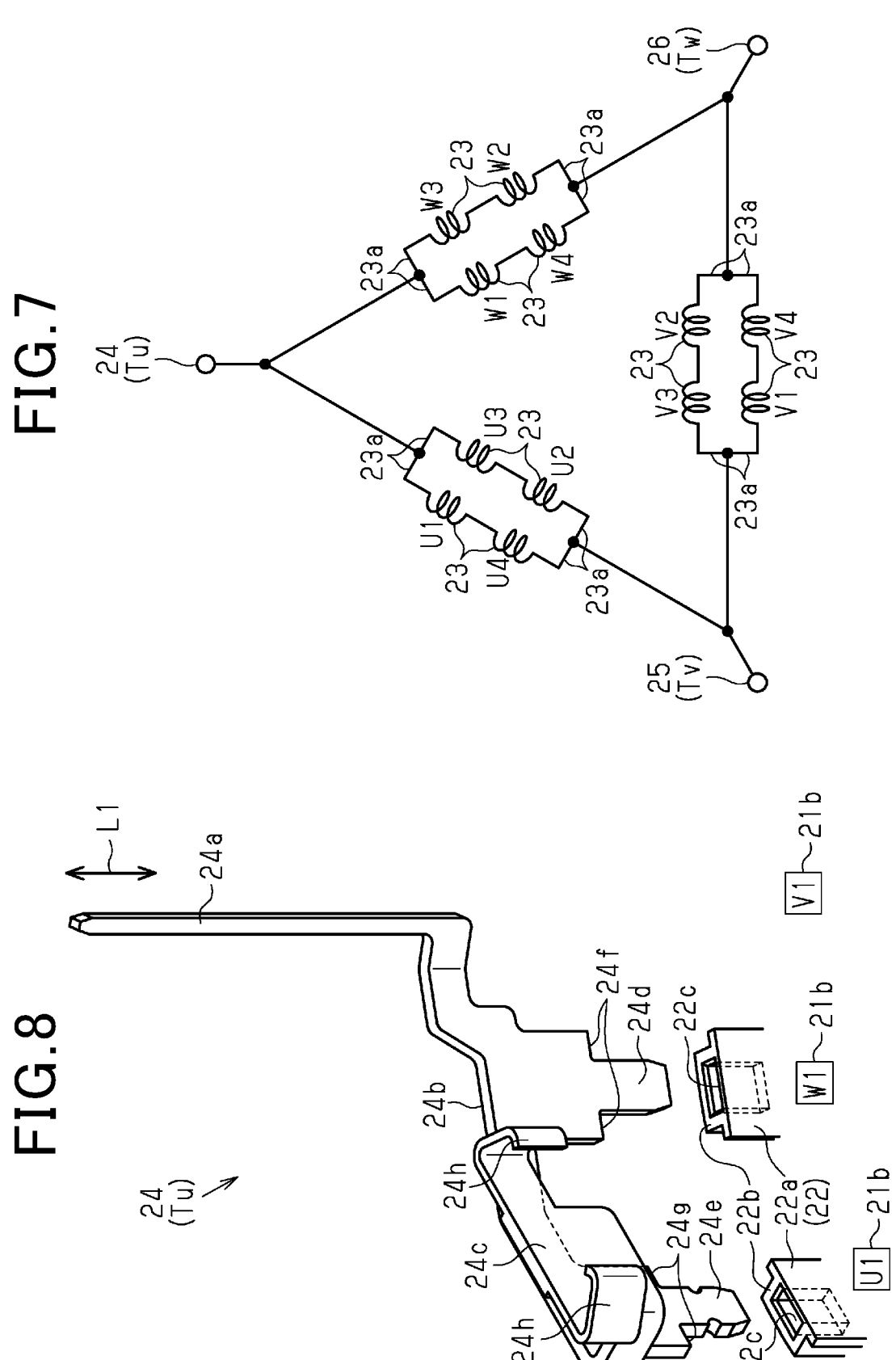
FIG. 7 is another connection diagram of the windings according to the embodiment.
FIG. 8 is a perspective view showing a terminal according to the embodiment.

As shown in FIG. 7, a Δ-connection is employed as the connection manner of the windings 23. Specifically, for the U-phase windings U1 to U4, the U-phase winding U1 and the U-phase winding U4 are connected in series with each other; the U-phase winding U3 and the U-phase winding U2 are connected in series with each other; and the serially-connected pair of the U-phase windings U1 and U4 and the serially-connected pair of the U-phase windings U3 and U2 are connected in parallel with each other. Similarly, for the V-phase windings V1 to V4, the V-phase winding V1 and the V-phase winding V4 are connected in series with each other; the V-phase winding V3 and the V-phase winding V2 are connected in series with each other; and the serially-connected pair of the V-phase windings V1 and V4 and the serially-connected pair of the V-phase windings V3 and V2 are connected in parallel with each other. Moreover, for the W-phase windings W1 to W4, the W-phase winding W1 and the W-phase winding W4 are connected in series with each other; the W-phase winding W3 and the W-phase winding W2 are connected in series with each other; and the serially-connected pair of the W-phase windings W1 and W4 and the serially-connected pair of the W-phase windings W3 and W2 are connected in parallel with each other.

In the present embodiment, three terminals 24 to 26 are employed for connection of the windings 23. Each of the three terminals 24 to 26 is made by blanking and bending an electrically-conductive metal plate into a predetermined shape (see FIGS. 8, 9 and 10). The three terminals 24 to 26 are respectively assigned to U-phase, V-phase and W-phase terminals Tu, Tv and Tw that respectively correspond to the U, V and W phases.

The U-phase terminal Tu is connected with each of end portions 23a of the U-phase windings U1 and U3 and each of end portions 23a of the W-phase windings W1 and W3. The V-phase terminal Tv is connected with each of end portions 23a of the V-phase windings V1 and V3 and each of end portions 23a of the U-phase windings U2 and U4. The W-phase terminal Tw is connected with each of end portions 23a of the W-phase windings W2 and W4 and each of end portions 23a of the V-phase windings V2 and V4. In this manner, the Δ-connection is formed with the windings 23 and the terminals 24 to 26.

Figure 9:
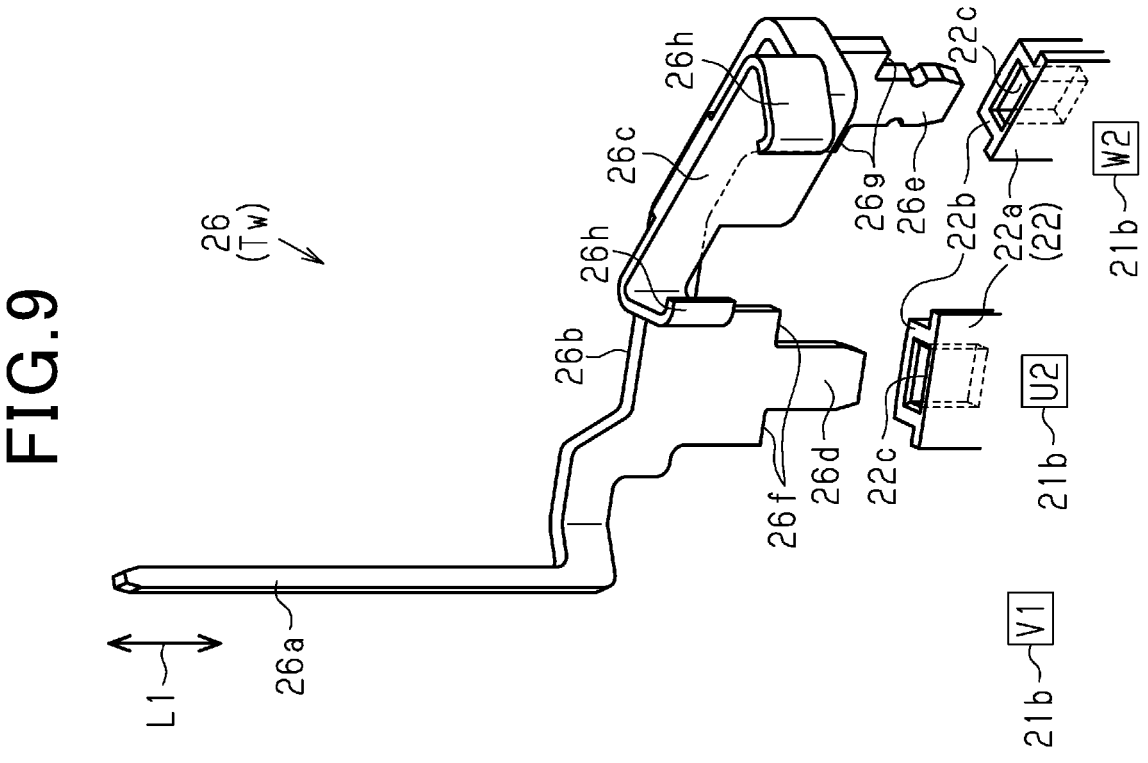
FIG. 9 is a perspective view showing another terminal according to the embodiment.
Figure 10:
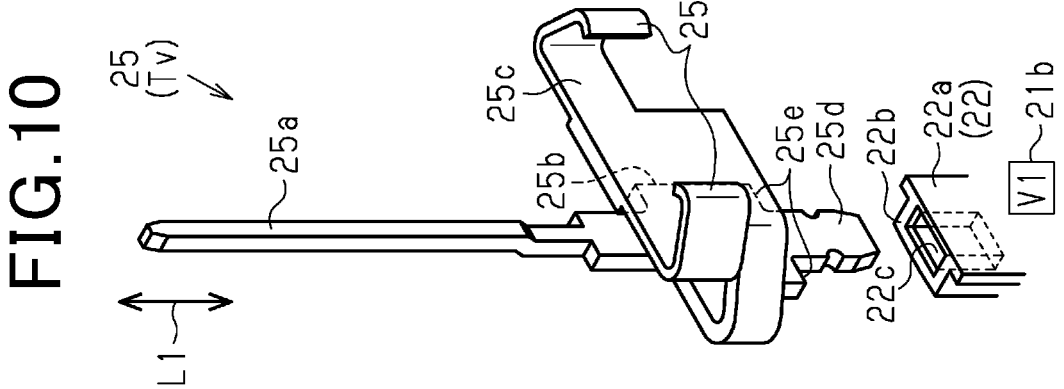
FIG. 10 is a perspective view showing yet another terminal according to the embodiment.

The U-phase, V-phase and W-phase terminals Tu, Tv and Tw are arranged side by side in the circumferential direction in such a posture that the flat-plate directions thereof are along the direction of the axis L1. The V-phase terminal Tv is arranged at a central position; and the U-phase terminal Tu and the W-phase terminal Tw are arranged respectively on opposite sides of the V-phase terminal Tv. The V-phase terminal Tv arranged at the central position has a relatively compact shape as shown in FIGS. 4 and 10. In contrast, the U-phase and W-phase terminals Tu and Tw arranged respectively on opposite sides of the V-phase terminal Tv have a relatively circumferentially-extending shape as shown in FIGS. 4, 8 and 9. Moreover, the shapes of the U-phase and W-phase terminals Tu and Tw are axisymmetric to each other.

As shown in FIG. 8, the terminal 24 assigned to the U-phase terminal Tu has a connection terminal portion 24a, an extension portion 24b and a winding connection portion 24c. The connection terminal portion 24a has an elongated bar shape. Moreover, the connection terminal portion 24a is formed so as to extend along the direction of the axis L1 in the posture of the terminal 24 being mounted to the insulator 22. The connection terminal portion 24a has its intermediate portion inserted through a corresponding one of the terminal insertion holes 15d of the base member 15 in the direction of the axis L1 (see FIG. 2), and its distal end portion inserted into a corresponding one of the terminal connection holes 14a of the circuit board 14 and thereby electrically connected to the circuit board 14. A proximal end portion of the connection terminal portion 24a is formed continuously and integrally with one end of the extension portion 24b that has a shape elongated in a direction perpendicular to the axis L1.

The extension portion 24b extends substantially for a circumferential length corresponding to two tooth portions 21b (see FIG. 5). Moreover, the extension portion 24b is bent in the plate thickness direction at two positions so as to extend along the outer peripheral edge of the stator core 21. The extension portion 24b includes an insertion piece 24d (or a mounting piece that is a part of the extension portion) and a press-fitting piece 24e (or a mounting piece that is a part of the extension portion). Both the insertion piece 24d and the press-fitting piece 24e extend in a downward direction and along the flat-plate direction of the extension portion 24b; the downward direction is opposite to an upward direction in which the connection terminal portion 24a extends. The insertion piece 24d and the press-fitting piece 24e are spaced from each other. Specifically, the insertion piece 24d is formed near the connection terminal portion 24a on one end side of the extension portion 24b. In contrast, the press-fitting piece 24e is formed near the winding connection portion 24c on the other end side of the extension portion 24b. Each of the insertion piece 24d and the press-fitting piece 24e is substantially rectangular in shape and has a distal end portion, which is a lower end portion, slightly reduced in width. On both sides of a proximal end portion of the insertion piece 24d, there are formed straight abutting edges 24f along a direction perpendicular to the axis L1. Similarly, on both sides of a proximal end portion of the press-fitting piece 24e, there are formed straight abutting edges 24g along a direction perpendicular to the axis L1. In addition, the abutting edges 24f are located on the same straight line, i.e., at the same height; and the abutting edges 24g are also located on the same straight line, i.e., at the same height.

The winding connection portion 24c is formed continuously and integrally with the other end of the extension portion 24b on the opposite side of the extension portion 24b to the connection terminal portion 24a. A part of the winding connection portion 24c, which is connected with the extension portion 24b, is bent radially inward so that the winding connection portion 24c is located radially inward of the extension portion 24b (see FIG. 5). The winding connection portion 24c extends substantially for a circumferential length corresponding to one tooth portion 21b. Moreover, the winding connection portion 24c is formed apart from the connection terminal portion 24a by a distance corresponding to one tooth portion 21b. The winding connection portion 24c has a pair of gripping portions 24h formed respectively at opposite circumferential ends thereof. One of the gripping portions 24h grips the end portions 23a of the U-phase winding U1 and the W-phase winding W1 (see FIG. 6), whereas the other of the gripping portions 24h grips the end portions 23a of the U-phase winding U3 and the W-phase winding W3. In addition, each of the gripping portions 24h grips the end portions 23a, each of which extends in the direction of the axis L1, in a direction perpendicular to the axis L1; and electrical connection between them is made by a winding connection device (not shown).

The above-described terminal 24 assigned to the U-phase terminal Tu is supported by those two protruding portions 22a of the insulator 22 which are respectively located on the two tooth portions 21b on which the W-phase winding W1 and the U-phase winding U1 are respectively wound. The insertion piece 24d near the connection terminal portion 24a is inserted in the direction of the axis L1 into the mounting hole 22c of the protruding portion 22a corresponding to the W-phase winding W1. More specifically, the insertion piece 24d is inserted until the abutting edges 24f on both sides of the insertion piece 24d are brought into abutment with the distal end surface (or abutting surface) 22b of the protruding portion 22a. Moreover, the insertion piece 24d is loosely fitted in the mounting hole 22c in such a manner that slight relative deviation is permitted in the directions perpendicular to the axis L1, i.e., in the radial and circumferential directions within the mounting hole 22c. On the other hand, the press-fitting piece 24e near the winding connection portion 24c is press-fitted in the direction of the axis L1 into the mounting hole 22c of the protruding portion 22a corresponding to the U-phase winding U1. More specifically, the press-fitting piece 24e is press-fitted until the abutting edges 24g on both sides of the press-fitting piece 24e are brought into abutment with the distal end surface 22b of the protruding portion 22a. Thus, the press-fitting piece 24e is held with respect to the protruding portion 22a by being press-fitted into the mounting hole 22c. That is, with the abutting edges 24f on both sides of the insertion piece 24d abutting against the distal end surface 22b of the protruding portion 22a corresponding to the W-phase winding W1 and the abutting edges 24g on both sides of the press-fitting piece 24e abutting against the distal end surface 22b of the protruding portion 22a corresponding to the U-phase winding U1, the terminal 24 assigned to the U-phase terminal Tu is supported at these plural positions. Moreover, with the press-fitting piece 24e held by the protruding portion 22a corresponding to the U-phase winding U1, the terminal 24 is prevented from being detached from the insulator 22. In addition, the connection terminal portion 24a is located at the proximal end portion of the tooth portion 21b on which the V-phase winding V1 is wound; and the winding connection portion 24c is located at an intermediate portion of the tooth portion 21b on which the U-phase winding U1 is wound.

As shown in FIG. 9, the shape of the terminal 26 assigned to the W-phase terminal Tw is axisymmetric to the shape of the above-described terminal 24 assigned to the U-phase terminal Tu shown in FIG. 8. Therefore, the terminal 26 assigned to the W-phase terminal Tw has a similar configuration and is supported in a similar manner to the terminal 24 assigned to the U-phase terminal Tu. Specifically, similar to the terminal 24 assigned to the U-phase terminal Tu, the terminal 26 assigned to the W-phase terminal Tw has a connection terminal portion 26a, an extension portion 26b and a winding connection portion 26c. The extension portion 26b has an insertion piece 26d (or a mounting piece that is a part of the extension portion) formed near the connection terminal portion 26a, and a press-fitting piece 26e (or a mounting piece that is a part of the extension portion) formed near the winding connection portion 26c. The winding connection portion 26c has a pair of gripping portions 26h formed respectively at opposite circumferential ends thereof. One of the gripping portions 26h grips the end portions 23a of the W-phase winding W2 and the V-phase winding V2 (see FIG. 6), whereas the other of the gripping portions 26h grips the end portions 23a of the W-phase winding W4 and the V-phase winding V4. In addition, each of the gripping portions 24h is electrically connected with the gripped end portions 23a.

The above-described terminal 26 assigned to the W-phase terminal Tw is supported by those two protruding portions 22a of the insulator 22 which are respectively located on the two tooth portions 21b on which the U-phase winding U2 and the W-phase winding W2 are respectively wound. The insertion piece 26d near the connection terminal portion 26a is inserted in the direction of the axis L1 into the mounting hole 22c of the protruding portion 22a corresponding to the U-phase winding U2 until abutting edges 26f on both sides of the insertion piece 26d are brought into abutment with the distal end surface 22b of the protruding portion 22a. Moreover, the insertion piece 26d is loosely fitted in the mounting hole 22c in such a manner that slight relative deviation is permitted in the directions perpendicular to the axis L1, i.e., in the radial and circumferential directions within the mounting hole 22c. On the other hand, the press-fitting piece 26e near the winding connection portion 26c is press-fitted in the direction of the axis L1 into the mounting hole 22c of the protruding portion 22a corresponding to the W-phase winding W2 until abutting edges 26g on both sides of the press-fitting piece 26e are brought into abutment with the distal end surface 22b of the protruding portion 22a. Thus, the press-fitting piece 26e is held with respect to the protruding portion 22a by being press-fitted into the mounting hole 22c. That is, with the abutting edges 26f on both sides of the insertion piece 26d abutting against the distal end surface 22b of the protruding portion 22a corresponding to the U-phase winding U2 and the abutting edges 26g on both sides of the press-fitting piece 26e abutting against the distal end surface 22b of the protruding portion 22a corresponding to the W-phase winding W2, the terminal 26 assigned to the W-phase terminal Tw is supported at these plural positions. Moreover, with the press-fitting piece 26e held by the protruding portion 22a corresponding to the W-phase winding W2, the terminal 26 is prevented from being detached from the insulator 22. In addition, the connection terminal portion 26*a* is located at the proximal end portion of the tooth portion 21*b* on which the V-phase winding V1 is wound; and the winding connection portion 26*c* is located at an intermediate portion of the tooth portion 21*b* on which the W-phase winding W2 is wound.

As shown in FIG. 10, the terminal 25 assigned to the V-phase terminal Tv has a connection terminal portion 25*a*, a base portion 25*b* and a winding connection portion 25*c*. The connection terminal portion 25*a* and the winding connection portion 25*c* have the same configurations as the connection terminal portion 24*a* and the winding connection portion 24*c* of the terminal 24 assigned to the U-phase terminal Tu shown in FIG. 8. The base portion 25*b* is formed continuously with a proximal end portion of the connection terminal portion 25*a*. The base portion 25*b* has a rectangular plate shape and is arranged in such a posture that the flat-plate direction thereof is along the direction of the axis L1. At a lower end of the base portion 25*b*, a press-fitting piece 25*d* extends along the flat-plate direction of the base portion 25*b*, like the press-fitting piece 24*e* of the terminal 24 assigned to the U-phase terminal Tu. Moreover, on both sides of a proximal end portion of the press-fitting piece 25*d*, there are formed straight abutting edges 25*e* along a direction perpendicular to the axis L1.

A part of the winding connection portion 25*c*, which is connected with the base portion 25*b*, is bent radially inward so that the winding connection portion 25*c* is located radially inward of the base portion 25*b* (see FIG. 5). The winding connection portion 25*c* has a pair of gripping portions 25*f* formed respectively at opposite circumferential ends thereof. One of the gripping portions 25*f* grips the end portions 23*a* of the V-phase winding V1 and the U-phase winding U2 (see FIG. 6), whereas the other of the gripping portions 25*f* grips the end portions 23*a* of the V-phase winding V3 and the U-phase winding U4. In addition, each of the gripping portions 25*f* is electrically connected with the gripped end portions 23*a*.

The above-described terminal 25 assigned to the V-phase terminal Tv is supported by that protruding portion 22*a* of the insulator 22 which is located on the tooth portion 21*b* on which the V-phase winding V1 is wound. Specifically, the press-fitting piece 25*d* is press-fitted in the direction of the axis L1 into the mounting hole 22*c* of the protruding portion 22*a* corresponding to the V-phase winding V1 until the abutting edges 25*e* on both sides of the press-fitting piece 25*d* are brought into abutment with the distal end surface 22*b* of the protruding portion 22*a*. That is, with the abutting edges 25*e* on both sides of the press-fitting piece 25*d* abutting against the distal end surface 22*b* of the protruding portion 22*a* corresponding to the V-phase winding V1, the terminal 25 assigned to the V-phase terminal Tv is supported by the protruding portion 22*a*. Moreover, with the press-fitting piece 25*d* held by the protruding portion 22*a* corresponding to the V-phase winding V1, the terminal 25 is prevented from being detached from the insulator 22. In addition, the connection terminal portion 25*a* is located at the proximal end portion of the tooth portion 21*b* on which the V-phase winding V1 is wound; and the winding connection portion 25*c* is located at an intermediate portion of the tooth portion 21*b* on which the V-phase winding V1 is wound.

As described above, the terminals 24 to 26 of the respective phases are supported by the predetermined protruding portions 22*a* of the insulator 22. The connection terminal portions 24*a* to 26*a* are arranged close to each other as shown in FIG. 5, and connected to the circuit board 14 shown in FIG. 2. On the other hand, the gripping portions 24*h*, 25*f* and 26*h* of the winding connection portions 24*c* to 26*c* are spaced sufficiently apart from each other, and connected to the end portions 23*a* of the corresponding windings 23.

Next, operation of the present embodiment will be described together with explanation of a manufacturing process of the rotating electric machine 10. In manufacturing the rotating electric machine 10, for forming the stator 12, the windings 23 are wound on the tooth portions 21*b* of the core segments 21*x* having the insulator 22 mounted thereon; and all the core segments 21*x* are connected to each other in an annular shape. Consequently, the annular stator core 21 is obtained which is constituted of the twelve core segments 21*x* that are connected with each other. Then, the U-phase, V-phase and W-phase terminals 24 to 26 are mounted to the predetermined protruding portions 22*a* of the insulator 22. Specifically, the insertion pieces 24*d* and 26*d* and the press-fitting pieces 24*e* and 26*e* are inserted or press-fitted into the mounting holes 22*c* of the corresponding protruding portions 22*a*, so that the U-phase and W-phase terminals 24 and 26 are held by the corresponding protruding portions 22*a*. Moreover, the press-fitting piece 25*d* is press-fitted into the mounting hole 22*c* of the corresponding protruding portion 22*a*, so that the V-phase terminal 25 is held by the corresponding protruding portion 22*a*. Furthermore, the abutting edges 24*f*, 24*g*, 25*e*, 26*f* and 26*g* on both sides of each of the insertion pieces 24*d* and 26*d* and the press-fitting pieces 24*e*, 25*d* and 26*e* are brought into abutment with the distal end surfaces 22*b* of the corresponding protruding portions 22*a*, so that the terminals 24 to 26 of the respective phases are supported by the corresponding protruding portions 22*a*. At this time, the connection terminal portions 24*a* to 26*a* of the terminals 24 to 26 of the respective phases are arranged close to each other, and postured to be parallel with each other along the direction of the axis L1.

Moreover, in the winding connection portions 24*c* to 26*c* of the terminals 24 to 26 of the respective phases, the end portions 23*a* of the corresponding windings 23 are gripped by the gripping portions 24*h*, 25*f* and 26*h*. Then, by the winding connection device (not shown), the gripping portions 24*h*, 25*f* and 26*h* and the end portions 23*a* of the corresponding windings 23 are pressure-welded so that coating layers of the end portions 23*a* are melted and thus the terminals 24 to 26 are electrically connected with the corresponding windings 23. At this time, since the gripping portions 24*h*, 25*f* and 26*h* of the winding connection portions 24*c* to 26*c* are spaced sufficiently apart from each other, the connection work by the winding connection device can be easily performed. As a result, the stator 12 is completed.

The stator 12 is arranged, together with the spacer 18, in the accommodation recess 16*a* of the first case member 16 of the case 11. Further, the rotor 13 is rotatably arranged inside the stator 12. Thereafter, the first case member 16 and the base member 15 are fixed together. The connection terminal portions 24*a* to 26*a* of the terminals 24 to 26, which extend from the stator 12 in the direction of the axis L1, are inserted through the terminal insertion holes 15*d* of the insulating member 15*e* mounted to the base member 15, so as to protrude from the base member 15. Then, the connection terminal portions 24*a* to 26*a* protruding from the base member 15 are fitted into the terminal connection holes 14*a* of the circuit board 14 that is fixed to the base member 15; further, the connection terminal portions 24*a* to 26*a* are soldered to the circuit board 14, thereby being electrically connected to the circuit board 14. Thereafter, the second case member 17 of the case 11 is mounted to the base member 15. As a result, the rotating electric machine 10 is completed. It should be noted that: the above-described manufacturing process is merely an example; and the order of steps and the like may be changed as appropriate.

In the above-described manufacturing process of the rotating electric machine 10, various external forces may act on the connection terminal portions 24a to 26a of the terminals 24 to 26 in the steps of, for example, inserting the connection terminal portions 24a to 26a through the terminal insertion holes 15d of the base member 15 of the case 11 and connecting the connection terminal portions 24a to 26a to the circuit board 14. However, in the present embodiment, the posture of the V-phase terminal 25, which is mounted to only one protruding portion 22a of the insulator 22, can be sufficiently maintained by the press-fitting piece 25d and the abutting edges 25e on both sides of the press-fitting piece 25d. Moreover, the posture of the U-phase terminal 24, which is mounted to two protruding portions 22a of the insulator 22, can be sufficiently maintained by the insertion piece 24d, the abutting edges 24f on both sides of the insertion piece 24d, the press-fitting piece 24e and the abutting edges 24g on both sides of the press-fitting piece 24. Similarly, the posture of the W-phase terminal 26, which is also mounted to two protruding portions 22a of the insulator 22, can be sufficiently maintained by the insertion piece 26d, the abutting edges 26f on both sides of the insertion piece 26d, the press-fitting piece 26e and the abutting edges 26g on both sides of the press-fitting piece 26e. Therefore, even if external forces act on the connection terminal portions 24a to 26a, with the stable support structure capable of maintaining the postures of the terminals 24 to 26 mounted to the insulator 22, tilting of the terminals 24 to 26 can be suppressed as much as possible. As a result, the manufacture of the rotating electric machine 10 can be carried out smoothly.

Next, advantageous effects of the present embodiment will be described.

(1) The terminals 24 to 26 of the stator 12, in particular, the U-phase and W-phase terminals 24 and 26 each have the connection terminal portion 24a or 26a extending in the axial direction so as to be connected to the circuit board 14, the winding connection portion 24c or 26c connected with the end portions 23a of the corresponding windings 23, and the extension portion 24b or 26b extending in the circumferential direction between the connection terminal portion and the winding connection portion. Each of the terminals 24 and 26 is supported with parts of the extension portion 24b or 26b thereof abutting against the corresponding protruding portions 22a at a plurality of positions; the protruding portions 22a are supporting portions of the insulator 22 mounted to the stator core 21. That is, the posture of each of the terminals 24 and 26 is maintained by the stable support structure. Consequently, each of the terminals 24 and 26 is prevented from tilting even if the connection terminal portion 24a or 26a thereof is subjected to an external force during the manufacturing process of the rotating electric machine 10, such as when the connection terminal portion 24a or 26a is connected to the circuit board 14. As a result, the manufacture of the rotating electric machine 10 can be carried out smoothly.

(2) The insulator 22 has the plurality of protruding portions 22a arranged in the circumferential direction. Each of the protruding portions 22a has the mounting hole 22c extending in the axial direction. The extension portion 24b of the terminal 24 has the insertion piece 24d and the press-fitting piece 24e as a plurality of mounting pieces extending in the axial direction and fitted in the mounting holes 22c of the corresponding protruding portions 22a of the insulator 22. That is, the terminal 24 has a stable support structure such that the insertion piece 24d and the press-fitting piece 24e are fitted in the mounting holes 22c of the corresponding protruding portions 22a of the insulator 22; consequently, the posture of the terminal 24 can be sufficiently maintained. Similarly, the extension portion 26b of the terminal 26 has the insertion piece 26d and the press-fitting piece 26e as a plurality of mounting pieces extending in the axial direction and fitted in the mounting holes 22c of the corresponding protruding portions 22a of the insulator 22. That is, the terminal 26 has a stable support structure such that the insertion piece 26d and the press-fitting piece 26e are fitted in the mounting holes 22c of the corresponding protruding portions 22a of the insulator 22; consequently, the posture of the terminal 26 can be sufficiently maintained.

(3) The extension portion 24b of the terminal 24 has, as the plurality of mounting pieces fitted in the mounting holes 22c of the corresponding protruding portions 22a of the insulator 22, both the press-fitting piece 24e press-fitted in the mounting hole 22c of the corresponding protruding portion 22a and the insertion piece 24d loosely fitted in the mounting hole 22c of the corresponding protruding portion 22a. That is, the terminal 24 is supported by the insulator 22 via the two mounting pieces, i.e., the press-fitting piece 24e and the insertion piece 24d. Moreover, the terminal 24 is reliably held by the insulator 22 via the press-fitting piece 24e. Thus, the terminal 24 is stably and reliably supported by the insulator 22. In addition, since relative deviation of the insertion piece 24d in the mounting hole 22c of the corresponding protruding portion 22a is permitted, dimensional errors of the terminal 24 and its surroundings can be absorbed. Similarly, the extension portion 26b of the terminal 26 has, as the plurality of mounting pieces fitted in the mounting holes 22c of the corresponding protruding portions 22a of the insulator 22, both the press-fitting piece 26e press-fitted in the mounting hole 22c of the corresponding protruding portion 22a and the insertion piece 26d loosely fitted in the mounting hole 22c of the corresponding protruding portion 22a. That is, the terminal 26 is supported by the insulator 22 via the two mounting pieces, i.e., the press-fitting piece 26e and the insertion piece 26d. Moreover, the terminal 26 is reliably held by the insulator 22 via the press-fitting piece 26e. Thus, the terminal 26 is stably and reliably supported by the insulator 22. In addition, since relative deviation of the insertion piece 26d in the mounting hole 22c of the corresponding protruding portion 22a is permitted, dimensional errors of the terminal 26 and its surroundings can be absorbed.

(4) The terminal 24 has the abutting edges 24f extending in a direction perpendicular to the axis L1 on both sides of the proximal end portion of the insertion piece 24d and the abutting edges 24g extending in a direction perpendicular to the axis L1 on both sides of the proximal end portion of the press-fitting piece 24e. The abutting edges 24f and 24g of the terminal 24 axially abut against the abutting surfaces, i.e., the distal end surfaces 22b of the corresponding protruding portions 22a of the insulator 22. That is, the terminal 24 is stably supported with the abutting edges 24f and 24g thereof abutting against the distal end surfaces 22b of the corresponding protruding portions 22a; consequently, the posture of the terminal 24 can be sufficiently maintained. Similarly, the terminal 26 has the abutting edges 26f extending in a direction perpendicular to the axis L1 on both sides of the proximal end portion of the insertion piece 26d and the abutting edges 26g extending in a direction perpendicular to the axis L1 on both sides of the proximal end portion of the press-fitting piece 26e. The abutting edges 26f and 26g of the terminal 26 axially abut against the abutting surfaces, i.e., the distal end surfaces 22b of the corresponding protruding portions 22a of the insulator 22. That is, the terminal 26 is stably supported with the abutting edges 26f and 26g thereof abutting against the distal end surfaces 22b of the corresponding protruding portions 22a; consequently, the posture of the terminal 26 can be sufficiently maintained. In addition, the same applies to the terminal 25.

(5) The mounting holes 22c of the insulator 22 are formed at equal intervals in the circumferential direction of the stator core 21. Therefore, the mounting positions of the terminals 24 and 26 can be easily changed and thus the degree of freedom in mounting the terminals 24 and 26 can be increased. In addition, the same applies to the terminal 25.

(6) The connection terminal portion 24a and the winding connection portion 24c of the terminal 24 are formed apart from each other by a distance corresponding to one tooth portion 21b. Therefore, the work of connecting the winding connection portion 24c and the end portions 23a of the corresponding windings 23 can be performed without interfering with the connection terminal portion 24a. Similarly, the connection terminal portion 26a and the winding connection portion 26c of the terminal 26 are formed apart from each other by a distance corresponding to one tooth portion 21b. Therefore, the work of connecting the winding connection portion 26c and the end portions 23a of the corresponding windings 23 can be performed without interfering with the connection terminal portion 26a. It should be noted that: the connection terminal portion 24a and the winding connection portion 24c of the terminal 24 may be formed apart from each other by a distance longer than the distance corresponding to one tooth portion 21b; and the connection terminal portion 26a and the winding connection portion 26c of the terminal 26 may be formed apart from each other by a distance longer than the distance corresponding to one tooth portion 21b.

(7) The connection terminal portions 24a and 26a of the terminals 24 and 26 are formed to be thinner than the extension portions 24b and 26b. Therefore, if external forces act on the connection terminal portions 24a and 26a, the connection terminal portions 24a and 26a themselves will be bent, reducing loads applied to the other portions of the terminals 24 and 26. The same applies to the terminal 25. In addition, it is possible to maximize the intervals between the terminals 24 to 26 while saving space.

The present embodiment can be modified and implemented as follows. Moreover, the present embodiment and the following modifications can also be implemented in combination with each other to the extent that there is no technical contradiction between them.

The shapes of the terminals 24 to 26 of the respective phases in the above-described embodiment are merely an example, and may be modified as appropriate. For example, modifications may be made as shown in FIGS. 11 to 16. In these figures, there are illustrated specific modifications to the shape of the terminal 24 assigned to the U-phase terminal Tu.

Figure 11:
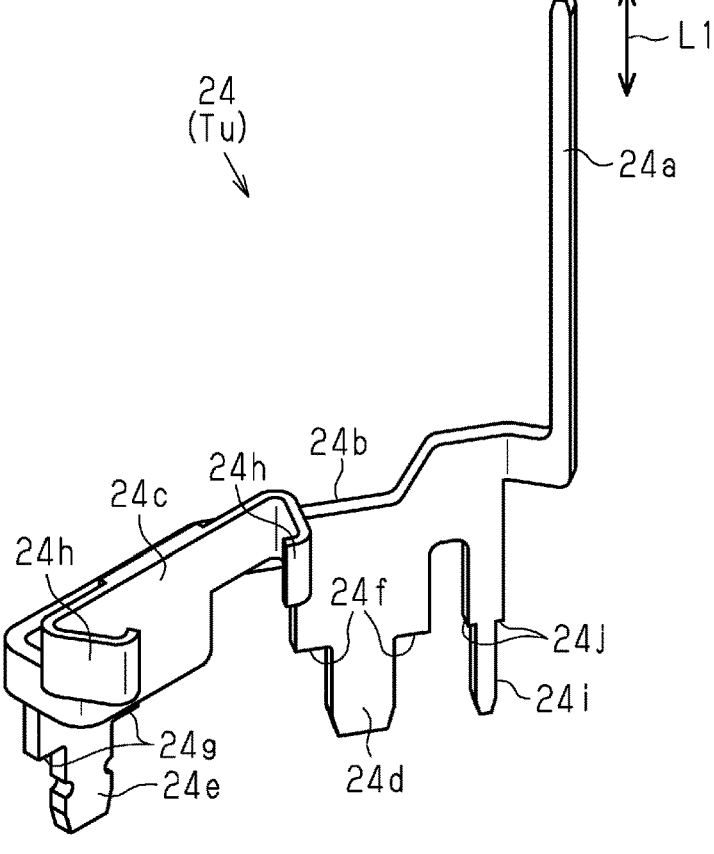
FIG. 11 is a perspective view showing a terminal according to a modification.

The terminal 24 shown in FIG. 11 has an insertion piece 24i added between the connection terminal portion 24a and the insertion piece 24d; the insertion piece 24i functions similarly to the insertion piece 24d. Moreover, abutting edges 24j are formed on both sides of the insertion piece 24i; the abutting edges 24j are shorter in length than the abutting edges 24f and 24g, but function similarly to them. In addition, in the insulator 22, there may be formed, as appropriate, a mounting portion (not shown) to which the newly-added insertion piece 24i can be mounted. By adding the insertion piece 24i and the abutting edges 24j as above, the stability of supporting the terminal 24 is improved.

Figure 12:
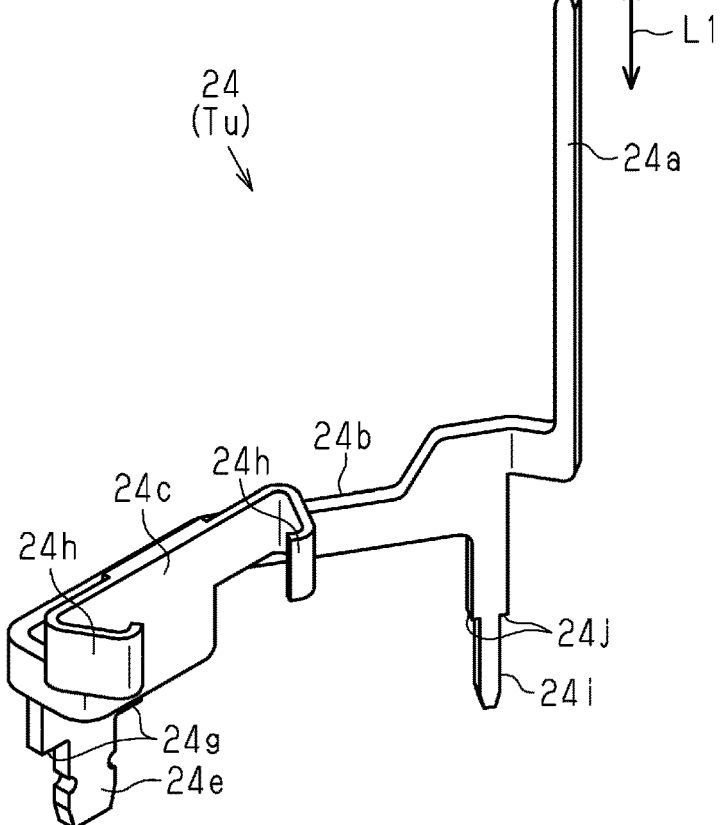
FIG. 12 is a perspective view showing a terminal according to another modification.
Figure 13:
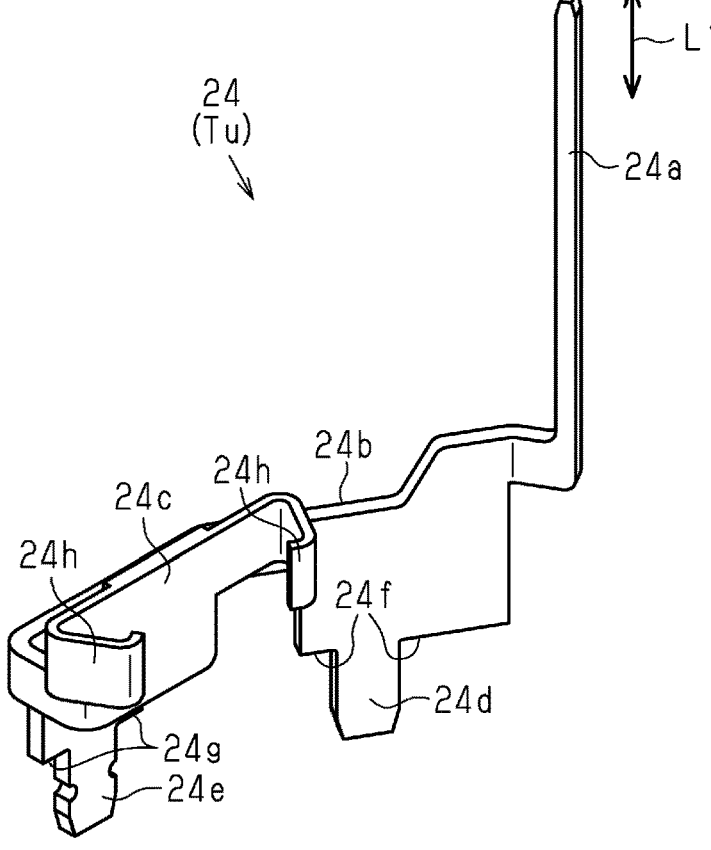
FIG. 13 is a perspective view showing a terminal according to another modification.

The terminal 24 shown in FIG. 12 also has the press-fitting piece 24e, the abutting edges 24g, the insertion piece 24i and the abutting edges 24j, but the insertion piece 24d and the abutting edges 24f are omitted therefrom. On the other hand, the terminal 24 shown in FIG. 13 has the insertion piece 24d, the abutting edges 24f, the press-fitting piece 24e and the abutting edges 24g, wherein the length of the abutting edge 24f on one side of the insertion piece 24d is increased.

Figure 14:
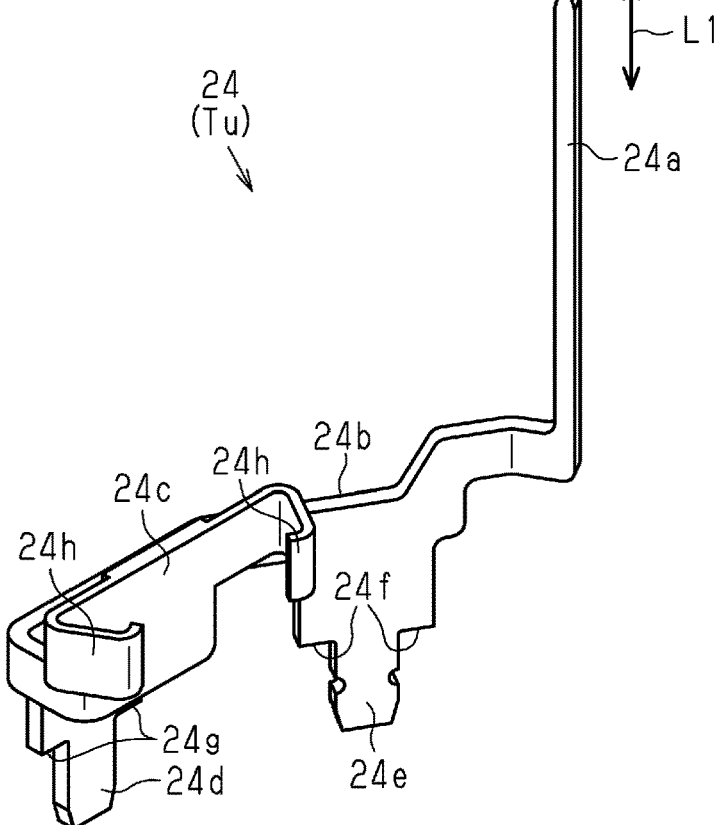
FIG. 14 is a perspective view showing a terminal according to another modification.
Figure 15:
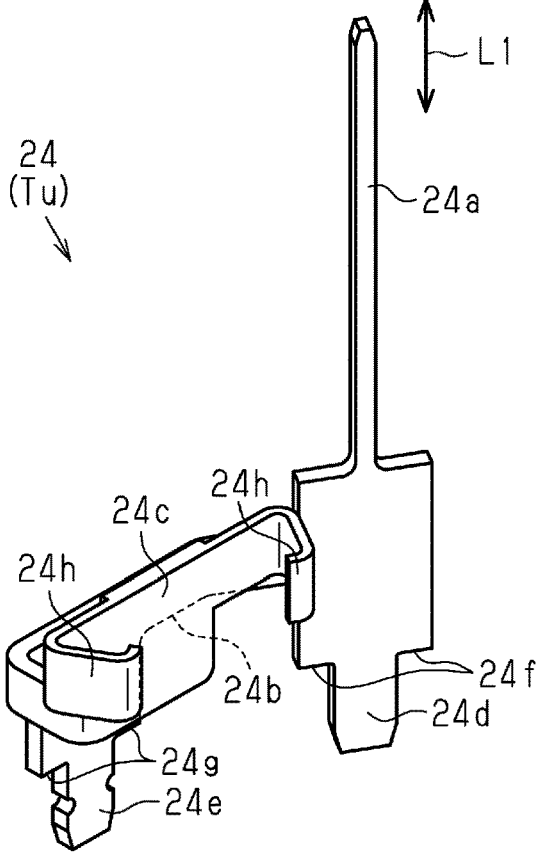
FIG. 15 is a perspective view showing a terminal according to another modification.

In the terminal 24 shown in FIG. 14, the insertion piece 24d is located further than the press-fitting piece 24e from the connection terminal portion 24a. On the other hand, in the terminal 24 shown in FIG. 15, the insertion piece 24d is formed at a position where it is aligned with the connection terminal portion 24a in the direction of the axis L1.

Figure 16:
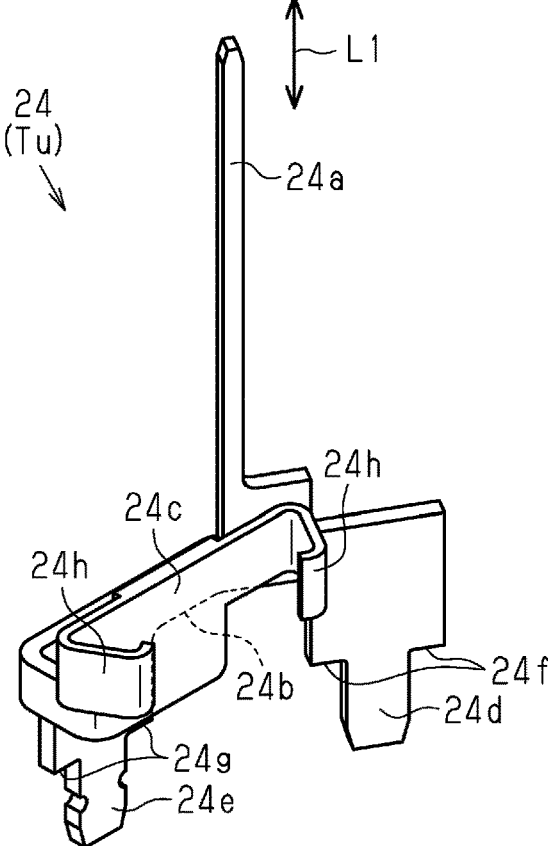
FIG. 16 is a perspective view showing a terminal according to another modification.

In the terminal 24 shown in FIG. 16, the connection terminal portion 24a is located between the insertion piece 24d and the press-fitting piece 24e.

In a further modification, there may be formed two or more press-fitting pieces 24e in the terminal 24. Moreover, in this case, the insertion piece 24d may be omitted from the terminal 24, leaving only the press-fitting pieces 24e in the terminal 24. In another modification, there may be formed two or more insertion pieces 24d in the terminal 24. Moreover, in this case, the press-fitting piece 24e may be omitted from the terminal 24, leaving only the insertion pieces 24d in the terminal 24. In yet another modification, there may be formed an abutting edge 24f only on one side of the insertion piece 24d. In still another modification, there may be formed an abutting edge 24g only on one side of the press-fitting piece 24e.

The above-described modifications to the U-phase terminal 24 may be similarly applied to the W-phase terminal 26 whose shape is axisymmetric to the shape of the U-phase terminal 24. Moreover, the above-described modifications may also be applied to the V-phase terminal 25.

The shapes and positions of the protruding portions 22a of the insulator 22, which support the terminals 24 to 26, may be modified as appropriate. For example, the protruding portions 22a and thus the mounting holes 22c may be formed not at equal intervals in the circumferential direction of the stator core 21. Moreover, the protruding portions 22a and thus the mounting holes 22c may be formed not over the entire circumference of the stator core 21.

In the above-described embodiment, the stator core 21 is constituted of the core segments 21x. Alternatively, the stator core 21 may be formed as a single piece. Moreover, in the above-described embodiment, the connection target, to which the connection terminal portions 24a to 26a of the terminals 24 to 26 are connected, is the circuit board 14. Alternatively, the connection target may be other electrical components than the circuit board 14.

In addition, the configuration of the rotating electric machine 10 may be modified as appropriate. The steps of the above-described manufacturing process of the rotating electric machine 10 are merely an example, and may be modified as appropriate.

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A stator comprising:

an annular stator core that has a plurality of tooth portions extending radially inward and arranged in a circumferential direction;

an insulator made of an electrically-insulative resin material and covering predetermined parts of the stator core;

windings wound on the tooth portions of the stator core with the insulator interposed therebetween; and terminals made of an electrically-conductive metal plate and connected with end portions of corresponding ones of the windings, wherein:

the stator is configured to be connectable to an electrical connection target via the terminals;

each of the terminals has a connection terminal portion extending in an axial direction so as to be connected to the connection target, a winding connection portion connected with the end portions of the corresponding windings, and an extension portion formed between the connection terminal portion and the winding connection portion and extending in the circumferential direction;

each of the terminals is supported, with part of the extension portion thereof abutting against a supporting portion of the insulator at a plurality of positions, so as to be capable of maintaining its posture;

the insulator has a plurality of the supporting portions arranged in the circumferential direction;

each of the supporting portions has a mounting hole extending in the axial direction;

the extension portion of each of the terminals has a plurality of mounting pieces extending in the axial direction and fitted in the mounting holes of corresponding ones of the supporting portions;

the plurality of mounting pieces include both a press-fitting piece press-fitted in the mounting hole of the corresponding supporting portion and an insertion piece loosely fitted in the mounting hole of the corresponding supporting portion; and the extension portion of each of the terminals has the press-fitting piece located closer to the winding connection portion than to the connection terminal portion in the circumferential direction, and has the insertion piece located closer than the press-fitting piece to the connection terminal portion in the circumferential direction.

2. The stator as set forth in claim 1, wherein:

each of the terminals has, on at least one side of a proximal end portion of each of the mounting pieces, an abutting edge extending in a direction perpendicular to the axial direction; and the abutting edge abuts against an abutting surface of the corresponding supporting portion of the insulator in the axial direction.

3. The stator as set forth in claim 1, wherein the mounting holes of the supporting portions of the insulator are formed at equal intervals in the circumferential direction of the stator core.

4. The stator as set forth in claim 1, wherein in each of the terminals, the connection terminal portion and the winding connection portion are formed apart from each other by a distance corresponding to one of the tooth portions or longer.

5. The stator as set forth in claim 1, wherein in each of the terminals, the connection terminal portion is formed to be thinner than the extension portion.

6. A rotating electric machine comprising a stator and a rotor, the stator comprising:

an annular stator core that has a plurality of tooth portions extending radially inward and arranged in a circumferential direction;

an insulator made of an electrically-insulative resin material and covering predetermined parts of the stator core;

windings wound on the tooth portions of the stator core with the insulator interposed therebetween; and terminals made of an electrically-conductive metal plate and connected with end portions of corresponding ones of the windings, the stator being configured to be connectable to an electrical connection target via the terminals, the rotor being configured to be driven, under a rotating magnetic field generated by the stator, to rotate, wherein:

each of the terminals has a connection terminal portion extending in an axial direction so as to be connected to the connection target, a winding connection portion connected with the end portions of the corresponding windings, and an extension portion formed between the connection terminal portion and the winding connection portion and extending in the circumferential direction;

each of the terminals is supported, with part of the extension portion thereof abutting against a supporting portion of the insulator at a plurality of positions, so as to be capable of maintaining its posture;

the insulator has a plurality of the supporting portions arranged in the circumferential direction;

each of the supporting portions has a mounting hole extending in the axial direction;

the extension portion of each of the terminals has a plurality of mounting pieces extending in the axial direction and fitted in the mounting holes of corresponding ones of the supporting portions;

the plurality of mounting pieces include both a press-fitting piece press-fitted in the mounting hole of the corresponding supporting portion and an insertion piece loosely fitted in the mounting hole of the corresponding supporting portion; and the extension portion of each of the terminals has the press-fitting piece located closer to the winding connection portion than to the connection terminal portion in the circumferential direction, and has the insertion piece located closer than the press-fitting piece to the connection terminal portion in the circumferential direction.

7. A stator comprising:

an annular stator core that has a plurality of tooth portions extending radially inward and arranged in a circumferential direction;

an insulator made of an electrically-insulative resin material and covering predetermined parts of the stator core;

windings wound on the tooth portions of the stator core with the insulator interposed therebetween; and terminals made of an electrically-conductive metal plate and connected with end portions of corresponding ones of the windings, wherein:

the stator is configured to be connectable to an electrical connection target via the terminals;

each of the terminals has a connection terminal portion extending in an axial direction so as to be connected to the connection target, a winding connection portion connected with the end portions of the corresponding windings, and an extension portion formed between the connection terminal portion and the winding connection portion and extending in the circumferential direction;

each of the terminals is supported, with part of the extension portion thereof abutting against a supporting portion of the insulator at a plurality of positions, so as to be capable of maintaining its posture; and in each of the terminals, the connection terminal portion and the winding connection portion are formed apart from each other by a distance corresponding to one of the tooth portions or longer.

8. A rotating electric machine comprising a stator and a rotor, the stator comprising:

an annular stator core that has a plurality of tooth portions extending radially inward and arranged in a circumferential direction;

an insulator made of an electrically-insulative resin material and covering predetermined parts of the stator core;

windings wound on the tooth portions of the stator core with the insulator interposed therebetween; and terminals made of an electrically-conductive metal plate and connected with end portions of corresponding ones of the windings, the stator being configured to be connectable to an electrical connection target via the terminals, the rotor being configured to be driven, under a rotating magnetic field generated by the stator, to rotate, wherein:

each of the terminals has a connection terminal portion extending in an axial direction so as to be connected to the connection target, a winding connection portion connected with the end portions of the corresponding windings, and an extension portion formed between the connection terminal portion and the winding connection portion and extending in the circumferential direction;

each of the terminals is supported, with part of the extension portion thereof abutting against a supporting portion of the insulator at a plurality of positions, so as to be capable of maintaining its posture; and in each of the terminals, the connection terminal portion and the winding connection portion are formed apart from each other by a distance corresponding to one of the tooth portions or longer.

* * * * *